United States Patent [19]

Abe et al.

[11] 4,042,548

[45] Aug. 16, 1977

[54] HIGHLY WEATHER-RESISTANT, THERMOFORMABLE SHEETING

[75] Inventors: Mitsuo Abe; Masaki Nagata; Masafumi Kikuchi, all of Yokkaichi, Japan

[73] Assignee: Japan Synthetic Rubber Company Limited, Tokyo, Japan

[21] Appl. No.: 622,513

[22] Filed: Oct. 15, 1975

[30] Foreign Application Priority Data

Oct. 21, 1974 Japan .............................. 49-121174

[51] Int. Cl.$^2$ .......................... C08K 5/12; C08K 5/15
[52] U.S. Cl. ...................... 260/23 XA; 260/23.7 H; 260/31.8 M; 260/876 R
[58] Field of Search ............ 260/31.8 M, 876, 23 XA, 260/23.7 H

[56] References Cited
U.S. PATENT DOCUMENTS 3,808,293  4/1974  Garrison ........................... 260/876 R Primary Examiner—Stanford M. Levin Attorney, Agent, or Firm—Haight & Huard

[57] ABSTRACT

A highly weather-resistant, thermoformable sheeting prepared by mixing from 45 to 70 parts by weight of a rigid thermoplastic resin selected from the group consisting of polyvinyl chlorides and copolymers each of which is composed mostly of a vinyl chloride and a small amount of a monoolefinic monomer copolymerizable with the vinyl chloride, from 20 to 50 parts by weight of a thermoplastic resin obtained by a graft polymerization of from 20 to 40 parts by weight of an ethylene-propylene copolymer rubber or ethylene-propylene-diene terpolymer with from 60 to 80 parts by weight of a vinyl monomer mixture consisting of from 40 to 90 percent by weight of an alkenyl aromatic compound and from 10 to 60 percent by weight of at least one monomer copolymerizable with the alkenyl aromatic compound, and from 5 to 35 parts by weight of an acrylonitrile-butadiene rubber, with from 5 to 50 parts by weight of a plasticizer or plasticizers added to the 100 parts by weight of the resinous mixture.

10 Claims, No Drawings

HIGHLY WEATHER-RESISTANT, THERMOFORMABLE SHEETING

This invention relates to an improved thermoformable sheeting useful in the manufacture of seats and covers for vehicles and furniture and also in various other applications including ornaments.

Sheetings to be fabricated by the thermo-vacuum (or vacuum forming) technique into articles such as seats for automobiles and cushions for chairs and sofas are required, for the ease of the vacuum processing and for the attainment of desired physical properties, to satisfy the following conditions. First, the sheet must not draw down with heat during the subsequent treatment and should stand thermoforming without deformation of the leathery pattern on the surface. Second, it must be highly weather-resistant and undergo little changes in tensile strength and elongation. Third, it must remain flexible for long with a minimum of plasticizer added and therefore with negligible evaporation of the additive with the elapse of time.

Actually, there has been no sheeting available for practical use which has both such desirable vacuum forming quality and weather resistance.

For example, the sheeting disclosed in the specification of Japanese Patent Publication No. 4391/61 is made of a resin composition prepared by adding acrylonitrile-styrene copolymer, acrylonitrile-butadiene rubber (NBR), and a plasticizer to polyvinyl chloride. Since the acrylonitrile-styrene copolymer is used with the view to offering high tensile strength at the heating temperature during the vacuum forming, the composition for the sheeting needs a large content of the plasticizer for polyvinyl chloride. The sheeting thus obtained is capable of being vacuum formed, but the formed products are subject to attacks of the sun rays, ozone, and heat energy, with marked deterioration in their physical properties, such as tensile strength, flexibility, and weatherability.

In view of the foregoing disadvantages of the conventional sheetings, the present invention has for its object to provide a sheeting which can be thermoformed while maintaining the configuration of the formed article when heated above the temperatures the plasticized resin material can stand, possesses excellent weather resistance, gives goods with long service life, and can be used in the fabrication of seats and dashboards of passenger cars and trucks, cushions for chairs and other seating furniture, etc., without the necessity of considering any such additional cost as is usually paid for the incorporation of fiber reinforcement.

Thus, according to the invention, there is provided a highly weather-resistant, thermoformable sheeting prepared by mixing (1) from 45 to 70 parts by weight of a rigid thermoplastic resin selected from the group consisting of polyvinyl chlorides and copolymers each of which is composed mostly of a vinyl chloride and a small amount of a monoolefinic monomer copolymerizable with the vinyl chloride, (2) from 20 to 50 parts by weight of a thermoplastic resin obtained by a graft polymerization of from 20 to 40 parts by weight of an ethylene-propylene copolymer rubber or ethylene-propylene-diene terpolymer with from 60 to 80 parts by weight of a vinyl monomer mixture consisting of from 40 to 90 wt.% of an alkenyl aromatic compound and from 10 to 60 wt.% of at least one monomer copolymerizable with the alkenyl aromatic compound, and (3) from 5 to 35 parts by weight of an acrylonitrile-butadiene rubber, with (4) from 5 to 50 parts by weight of a plasticizer or plasticizers for polyvinyl chloride added to the 100 parts by weight of the resinous mixture.

The vinyl chloride polymer to be used as the chief component of the sheeting according to the invention is a homopolymer of a vinyl chloride or a copolymer of more than 50% vinyl chloride and a small amount of another monoolefinic monomer. Among the other useful monoolefinic monomers copolymerizable with vinyl chloride are vinylidene chloride, vinyl acetate, dichlorostyrene, and various others known to those having ordinary knowledge in the art. Preferably, unformed granular polyvinyl chloride which is a hard, brittle high polymer with uniform molecular weight distribution and uniform particle size is used in making the sheeting in accordance with the invention.

Another component of the sheeting, the thermoplastic resin obtained by the graft polymerization of an ethylene-propylene copolymer rubber or ethylene-propylene-diene terpolymer with a vinyl monomer mixture consisting of an alkenyl aromatic compound and at least one monomer copolymerizable with the alkenyl aromatic compound, is hereinafter referred to as an AES resin. As the abbreviation implies, it is a variation of the so-called ABS resin, with the component B of the latter replaced by an ethylene-propylene copolymer or ethylene-propylene-diene terpolymer rubber. The alkenyl aromatic compound may be styrene, α-methylstyrene, or p-methylstyrene, or the like. As an alternative, two or more such compounds may be used in mixture.

Monomers copolymerizable with the alkenyl aromatic compound include vinylcyanic compounds such as acrylonitrile and methacrylonitrile, esters of acrylic acid, such as methyl acrylate, ethyl acrylate, and octyl acrylate, and esters of methacrylic acid, such as butyl methacrylate and methyl methacrylate. These monomers may also be used either singly or in a combination of two or more.

As the rubber content of the AES resin, the ethylene-propylene copolymer rubber or ethylene-propylene-diene terpolymer rubber must be limited in amount within the range from 20 to 40% of the total resin weight. If the amount of the rubber is less than 20%, the resulting leathery sheeting will not have adequate weather resistance. If the amount exceeds 40%, the product will be less suited for vacuum forming.

The AES resin may be prepared in a number of ways, for example by the emulsion polymerization as taught by the Japanese Patent Publication No. 14549/74, by the solution polymerization according to the Japanese Patent Publication No. 18118/73 or by the bulk polymerization.

The AES resin is desired to have a Q value between about 0.1 and about 10. (The Q value is obtained when the volume of the resin discharged for one second, at a temperature of 200° C and under a load of 30 kg/cm$^2$, from the nozzle, one millimeter in diameter and two millimeters long, of a Koka-type flow tester is multiplied by 10$^3$.) Also, for the purpose of the invention, the acrylonitrile-butadiene rubber (hereinafter called "NBR") is one containing from 10 to 45% bound acrylonitrile and usually used with vinyl chloride polymer. Suitable plasticizers for polyvinyl chloride are those in extensive use as such, including dioctyl phthalate (DOP), diisodecyl phthalate (DIDP) and other esters of phthalic acid, trioctyl trimellitate (TOTM) and other esters of trimellitic acid, and epoxy-fatty acid esters.

In order to confer good thermoformability on the thermoplastic film or sheet according to the invention, it is necessary to use from 5 to 50 parts (by weight) of a polyvinyl chloride plasticizer or plasticizers per 100 parts of the resinous mixture. The mixture with this compounding ratio will give a product with desirable physical properties and aptitude for vacuum forming. If the compounding recipe requires more plasticizer, the product will have a problem of inadequate compatibility between the resin and plasticizer, will exhibit inferior physical properties, and will behave unsatisfactorily during vacuum forming, as with sagging of the sheet.

For the reasons stated, the amount of the plasticizer for polyvinyl chloride to be added to the resinous mixture is restricted within the range above specified. However, there is no limitation as to the kind of the plasticizer; any commercially available plasticizer selected, for example, from among dibutyl phthalate (DBP), diheptyl phthalate (DHP), DOP, dinonyl phthalate (DNP), DIDP, and TOTM may be employed. Such a plasticizer may also be used together with the generally accepted secondary plasticizers for polyvinyl chloride, for example the epoxy plasticizers being sold under the trade names of "SEKISUICIZER No. 300" (by Sekisui Chemical Co.) and "ADEKACIZER 0-130P" (by Adeka-Argus).

As already noted, the resin composition for the sheeting of the invention is limited in proportions to from 45 to 70 parts by weight of a vinyl chloride polymer, from 20 to 50 parts by weight of an AES resin, and from 5 to 35 parts of an NBR. If the AES resin content is less than 20 parts by weight, it will be nearly impossible to expect an appreciable improvement in the weather resistance of the resulting sheeting. In addition, there will arise a problem of sheet sagging during the subsequent vacuum forming. Conversely, an AES resin proportion of over 50 parts by weight will cause other troubles, such as insufficient spreading of the resultant for vacuum forming. The reason for which the NBR proportion is restricted within the range of 5 to 35 parts by weight is that, if the compounding recipe includes more or less NBR than in the specified range, the sheeting thus obtained will often have poor vacuum formability or may cause difficulty in calendering.

Further, if the vinyl chloride polymer that constitutes the main component of the sheeting of the invention exceeds the upper limit of 70 parts by weight, sagging of the sheet or deformation of the leathery embossed pattern may occur during the course of vacuum forming, with a decrease of the weather resistance. On the other hand, less than 45 parts of the vinyl chloride polymer will provide improved resistance to heat and weathering but the sheeting will have poor vacuum formability and become costly.

After the investigation above described, it has now been found that a leathery thermoplastic sheeting having excellent weather resistance and vacuum formability is made from a composition consisting of from 45 to 70 parts by weight of a vinyl chloride polymer, from 20 to 50 parts by weight of an AES resin, and from 5 to 35 parts by weight of an NBR, with 5 to 50 parts by weight of a plasticizer or plasticizers for polyvinyl chloride added to the 100 parts of the resinous mixture.

The leathery sheeting of the invention may be made in a variety of ways known in the art, with the components, namely, the vinyl chloride polymer, NBR, AES resin, and plasticizer, added and mixed freely in a desired order.

For example, a polyvinyl chloride, plasticizers, namely, DIDP and "KAPOX-S-6" (trade name), and a cadmium-barium stabilizer are thoroughly mixed at 130°–180° C on a Banbury mixer. Next, an NBR and an AES resin are added to the charge and are mixed together at 150°–220° C until a uniform mixture results. The plasticized resinous mixture is then subjected to a final heat treatment and is finished by calendering to the form of a sheet.

In order to adjust the hardness, rigidity, or other property of the leathery sheeting of the invention, it is, of course, possible to add a suitable amount of a filler, such as calcium carbonate or clay to the material.

The present invention is illustrated by the following examples, although the invention is not limited thereto but may otherwise be embodied without departing from the spirit of the invention.

EXAMPLE 1–7

Resin compounding recipes (all parts by weight):

| | Parts |
|---|---|
| Polyvinyl chloride "ARON NS-1100" (trade name of a Toa Gosei Chemical product) | 45 – 70 |
| Acrylonitrile-butadiene rubber "JSR N230SH" (trade name of a Japan Synthetic Rubber product) | 5 – 35 |
| AES-1 * | 20 – 40 |
| Plasticizers ** "TRIMEX T-08" (trade name of a Kao Soap product) | 20 |
| "KAPOX-S-6" (trade name of a Kao Soap product) | 3 |

* AES-1 is a thermoplastic resin prepared by the graft polymerization of 24 parts by weight of an ethylene-propylene-diene terpolymer rubber with 76 parts by weight of a vinyl monomer mixture consisting of 20 parts by weight of styrene, 30 parts by weight of α-methylstyrene, and 26 parts by weight of acrylonitrile, in conformity of the technique of emulsion polymerization taught by the Japanese Patent Publication No. 14549/74.
** The amounts of the plasticizers added are given in parts per 100 parts by weight of the resinous mixture (consisting of polyvinyl chloride, acrylonitrile-butadiene rubber, and AES-1).

In each Example, the "ARON NS-1100", "NBR230SH", "TRIMEX T-08", and "KAPOX-S-6" were mixed and uniformly kneaded on a Banbury mixer at 150° C. During the kneading, 3.5 parts by weight of a cadmium-barium stabilizer was added. The kneaded resinous mixture was passed through a test calender at 180° C to form a 0.5 mm-thick sheet. The sheet was embossed with a leathery pattern. The procedure was repeated but with different proportions of the components within the ranges specified. The physical properties of the test sheets thus obtained were examined.

Table 1 gives the compounding proportions (in parts by weight) of the resinous components in Examples 1 through 7 and summarizes the results.

Table 1

| | EXAMPLE | | | | | | |
|---|---|---|---|---|---|---|---|
| | 1 | 2 | 3 | 4 | 5 | 6 | 7 |
| Composition (in wt. parts): | | | | | | | |
| "NS-1100" | 45 | 60 | 70 | 45 | 60 | 70 | 50 |
| "AES-1" | 40 | 35 | 25 | 20 | 30 | 20 | 40 |
| "NBR" | 15 | 5 | 5 | 35 | 10 | 10 | 10 |
| "T-08" | 20 | 20 | 20 | 20 | 20 | 20 | 20 |
| "KAPOX-S-6" | 3 | 3 | 3 | 3 | 3 | 3 | 3 |

Table 1-continued

| | EXAMPLE | | | | | | |
|---|---|---|---|---|---|---|---|
| | 1 | 2 | 3 | 4 | 5 | 6 | 7 |
| Shore hardness | 52 | 58 | 62 | 50 | 58 | 63 | 55 |
| Pattern stability | Good | 58 | 62 | 50 | 58 | 63 | 55 |
| Surface smoothness | Good | 58 | 62 | 50 | 58 | 63 | 55 |
| Thermal shrinkage | −1.5 | −1.5 | −2.0 | −1.5 | −3.0 | −3.0 | −1.5 |
| Sb at 200° C | 0.18 | 0.14 | 0.10 | 0.25 | 0.12 | 0.08 | 0.13 |
| γb at 200° C | 300 | 250 | 350 | 270 | 350 | 340 | 340 |
| Sb at 180° C | 0.45 | 0.40 | 0.30 | 0.44 | 0.41 | 0.29 | 0.35 |
| γb at 180° C | 230 | 240 | 220 | 200 | 230 | 210 | 220 |
| Sb at 25° C | 190 | 200 | 230 | 170 | 210 | 240 | 220 |
| γb at 25° C | 200 | 195 | 190 | 190 | 200 | 195 | 190 |
| Sb residue | 100 | 100 | 95 | 95 | 90 | 90 | 100 |
| γb residue | 95 | 95 | 85 | 90 | 85 | 85 | 95 |
| Vacuum formability | Good | 95 | 85 | 90 | 85 | 85 | 95 |

Notes:
1. Shore hardness:- Type D.
2. Pattern stability:- A 10 cm × 10 cm sheet specimen embossed with a leathery pattern was dipped in an oil bath (at 200° C) for 5 min., and the extent of pattern deformation was observed and evaluated with the naked eye.
3. Surface smoothness:- Each composition was kneaded with 8-in. rolls (with a nip of 1.0 mm) at 170° C for 5 min., the mixture was formed into a test sheet, and then the smoothness of its surface was visually evaluated.
4. Thermal shrinkage:- Each calendered sheet was cut to a size of 10 cm × 10 cm, the test specimen was heated in a Geer oven at 180° C for 5 min. and was allowed to stand at room temperature for 24 hrs., and then the rate of shrinkage attained was measured (in the direction of sheet extrusion) and given in percent.
5. Sb at 25° C, 180° C, and 200° C:- The test specimens were made by punching the calendered sheets in the extruding direction with a No.1 dumbbell conforming to the Japanese Industrial Standards. The specimens were tested on a tensile tester equipped with a thermostat, and their breaking strength (Sb) values were determined and expressed in kg/cm$^2$. For the test the specimens were preheated for 3 min., and then pulled at a rate of 200 mm/min.
6. γb at 25° C, 180° C and 200° C:- By the same procedure as above described, the elongation at break (γb) of each specimen was determined and expressed as a percentage of the original length.
7. Residue (%):- The value (of the breaking strength or elongation at break) after a test under conditions equivalent to a year of outdoor exposure, as determined with a sunshine weather meter, was divided by the initial value and then multiplied by 100 to indicate the strength drop-off.
8. Vacuum formability:- This test was to determine the ability of each leathery sheet to be shaped to an article of a desired configuration by vacuum forming. Each sheet specimen was preheated at 190° C for 30 –60 sec., vacuum formed to a cylindrical cup, and was visually inspected for any break, pinhole, uneven thickness, warpage or other defect. The result is expressed in depictive terms of evaluation.

It can be seen from Table 1 that the products in Examples 1 to 7 were satisfactory in all respects including the vacuum formability and weatherability.

EXAMPLE 8

Resin compounding recipe:

| | parts |
|---|---|
| PVC ("ARON NS-1100") | 60 |
| AES-1 | 33 |
| NBR ("JSR N230SH") | 7 |
| Plasticizers | 20 |
| (16 parts "T-08" & 4 parts "S-6") | |
| Stabilizer (Cd-Ba type) | 2.5 |

* The amounts of the plasticizers added are given in parts per 100 parts by weight of the resinous mixture (consisting of "ARON NS-1100", AES-1, and NBR). The amount of the stabilizer is in parts per 100 parts by weight of the "ARON NS-1100".

REFERENTIAL EXAMPLE 1

The same procedure as described in Example 8 was followed with the exception that the AES-1 in the Example was replaced by 33 parts by weight of an ABS resin "JSR ABS No. 45" (a trade name).

REFERENTIAL EXAMPLE 2

The procedure described in Example 8 was repeated except that the AES-1 was replaced by 33 parts of a thermoplastic resin (hereinafter called "AES-2") obtained by graft polymerizing 50 parts by weight of an ethylene-propylene-diene terpolymer rubber with 50 parts by weight of a vinyl monomer mixture consisting of 20 parts by weight of styrene, 15 parts by weight of α-methylstyrene, and 15 parts by weight of acrylonitrile.

REFERENTIAL EXAMPLE 3

The procedure of Example 8 was repeated except that the AES-1 was replaced by 33 parts by weight of a thermoplastic resin (hereinafter called "AES-3") prepared by graft polymerizing 10 parts by weight of an ethylene-propylene-diene terpolymer rubber with 90 parts by weight of a vinyl monomer mixture consisting of 40 parts by weight of styrene, 30 parts by weight of α-methylstyrene, and 20 parts by weight of acrylonitrile.

REFERENTIAL EXAMPLE 4

The procedure of Example 8 was repeated except that the AES-1 was replaced by 33 parts by weight of an acrylonitrile-styrene resin.

EXAMPLE 9

Resin compounding recipe:

| | |
|---|---|
| "ARON NS-1100" | 45 parts |
| AES-1 | 45 parts |
| NBR ("JSR N230SH") | 10 parts |
| Plasticizers** | 30 parts |
| (26 parts "T-08" & 4 parts "S-6") | |
| Stabilizer (Cd-Ba type)** | 2 parts |

** The amouts of the plasticizers added are given in parts per 100 parts by weight of the resinous mixture (consisting of "ARON NS-1100", AES-1, and NBR). The amount of the stabilizer is in parts per 100 parts by weight of the "ARON NS-1100").

REFERENTIAL EXAMPLE 5

The procedure of Example 9 was repeated except that the AES-1 was replaced by 45 parts by weight of "JSR ABS No. 45".

REFERENTIAL EXAMPLE 6

The AES-1 in Example 9 was replaced by 45 parts by weight of AES-2.

REFERENTIAL EXAMPLE 7

The AES-1 in Example 9 was replaced by 45 parts by weight of AES-3.

REFERENTIAL EXAMPLE 8

The AES-1 in Example 9 was replaced by 45 parts by weight of an acrylonitrile-styrene resin.

The compositions obtained in accordance with the above-mentioned compounding recipes were thoroughly mixed and fed to a test calender to form sheets under the same conditions as described in Examples 1 through 7. With the sheets thus obtained tests were conducted to evaluate their physical properties.

Table 2 presents a summary of the results.

Table 2

| | Ex. 8 | Ref. Ex. 1 | Ref. Ex. 2 | Ref. Ex. 3 | Ex. 4 | Ex. 9 | Ref. Ex. 5 | Ref. Ex. 6 | Ref. Ex. 7 | Ref. Ex. 8 |
|---|---|---|---|---|---|---|---|---|---|---|
| Composition (in parts by weight) | PVC (60) | 1 | 2 | 3 | 4 | PVC (45) | 5 | 6 | 7 | 8 |
| | AES-1 (33) | ABS (33) | AES-2 (33) | AES-3 (33) | AS (33) | AES-1 (45) | ABS-1 (45) | AES-2 (45) | AES-3 (45) | AS (45) |
| | NBR (7) | ABS (33) | AES-2 (33) | AES-3 (33) | AS (33) | NBR (10) | ABS-1 (45) | AES-2 (45) | AES-3 (45) | AS (45) |
| | T-08 (16) | ABS (33) | AES-2 (33) | AES-3 (33) | AS (33) | T-08 (26) | ABS-1 (45) | AES-2 (45) | AES-3 (45) | AS (45) |
| | S-6 (4) | ABS (33) | AES-2 (33) | AES-3 (33) | AS (33) | S-6 (4) | ABS-1 (45) | AES-2 (45) | AES-3 (45) | AS (45) |
| Shore hardness | 60 | 66 | 54 | 67 | 73 | 52 | 55 | 43 | 56 | 64 |
| Pattern stability | B | B | B | B | C | B | B | B | B | C |
| Surface smoothness | B | A | B | B | A | B | C' | B | A | D |
| Thermal shrinkage | −1.0 | −3.0 | −2.5 | −1.5 | −5.0 | −2.0 | −3.5 | −2.5 | −3.0 | −5.5 |
| Sb at 200° C | 0.17 | 0.02 | 0.19 | 0.007 | 0.002 | 0.15 | 0.11 | 0.17 | 0.08 | 0.011 |
| Sb at 180° C | 0.34 | 0.35 | 0.63 | 0.30 | 0.17 | 0.40 | 0.43 | 0.64 | 0.28 | 0.10 |
| Sb at 25° C | 205 | 260 | 165 | 215 | 220 | 185 | 230 | 110 | 230 | 195 |
| γb at 200° C | 300 | 350 | 155 | 310 | 340 | 300 | 330 | 160 | 320 | 340 |
| γb at 180° C | 220 | 250 | 130 | 200 | 210 | 220 | 210 | 80 | 210 | 200 |
| γb at 25° C | 195 | 235 | 145 | 145 | 120 | 190 | 235 | 145 | 160 | 110 |
| γb residue | 90 | 45 | 95 | 70 | 50 | 90 | 40 | 90 | 65 | 50 |
| Sb residue | 100 | 75 | 100 | 100 | 80 | 100 | 70 | 100 | 95 | 75 |
| Shore hardness residue | 101 | 107 | 101 | 102 | 105 | 100 | 105 | 100 | 101 | 103 |
| Vacuum formability | B | A | D | A | D | B | A | D | A | A |

Note: A = fairly good; B = good or passable; C = rather poor, C' = somewhat problematic, D = poor. The Shore hardness, pattern stability, and other properties were determined by the same methods as described in connection with Table 1.

Comparing Example 8 with Referential Examples 1 to 4 on the basis of the test results given in Table 2, it will be seen that the AES resins used in Example 8 and Referential Examples 2 and 3 confer good weather resistance on the sheeting, but the vacuum formability of the product is unfavorably affected when using 50 or 10 parts by weight of an ethylene-propylene-diene terpolymer rubber, as a rubber component, per 100 parts by weight of an AES resin as in Referential Example 2 or 3, respectively.

Similarly, a comparison of Example 9 with Referential Examples 5 to 8 reveals that the use of an AES resin as in Example 9 and Referential Examples 6 and 7 improves the weather resistance but when the rubber content is outside the range of 20 to 40 parts by weight per 100 parts by weight of the AES resin, the vacuum formability is low.

It will be appreciated from the foregoing that, in the practice of the invention, the optimum amount of the ethylene-propylene copolymer rubber or ethylene-propylene-diene terpolymer rubber as the rubber component is between 20 and 40 parts by weight per 100 parts by weight of the AES resin.

As has been described hereinbefore, the sheeting of the invention is prepared by mixing from 45 to 70 parts by weight of a rigid thermoplastic resin selected from the group consisting of polyvinyl chloride and copolymers each of which is composed mostly of a vinyl chloride and a small amount of a monoolefinic monomer copolymerizable with the vinyl chloride, from 20 to 50 parts by weight of a thermoplastic resin obtained by a graft polymerization of from 20 to 40 parts by weight of an ethylene-propylene copolymer rubber or ethylene-propylene-diene terpolymer with from 60 to 80 parts by weight of a vinyl monomer mixture consisting of from 40 to 90 percent by weight of an alkenyl aromatic compound and from 10 to 60 percent by weight of at least one monomer copolymerizable with the alkenyl aromatic compound, and from 5 to 35 parts by weight of an acrylonitrile-butadiene rubber, with from 5 to 50 parts by weight of a plasticizer or plasticizers added to the 100 parts by weight of the resinous mixture. The sheeting thus obtained has excellent thermoformability and weatherability with no sagging or deformation of any embossed pattern on the surface due to the thermoforming and also with little changes in its tensile strength and elongation. These desirable properties with protect the articles fabricated of the sheeting against deterioration in quality for extended periods of time.

REFERENTIAL EXAMPLES 9–16

These examples show that when the proportions of incorporation of vinyl chloride resin, AES resin and NBR are deviated from the range as defined by the present invention either vacuum formation or the physical properties of the produced sheet is liable to become unsatisfactory. Moreover the materials used in the referential examples are same as those used in the examples 1–7. Namely ARON NS-1100(A), AES-1(B) and JSR N230SH(C) were mixed in the proportion of incorporation (A+B+C=100 parts by weight) as shown in Table 3 and the constituents were evenly kneaded by mixing at 150° C using a Bancury mixer. At this instant, a stabilizer of cadmium-barium, 3.5 parts by weight per 100 parts of A was added and moreover, T-08, 20 parts by weight, KAPOX-S-6, 3 parts by weight were added as plasticizers. The resin thus kneaded was formed into a sheet, 0.5 mm thick at 180° C using a test calender, and the sheet thus obtained was leather-patterned for purposes of investigation of the physical properties and vacuum formation of the sheet of each example. Table 3 shows the proportions of resins, (parts by weight) and test results of the comparative examples 9–16.

Table 3

|  |  | Ref. Ex. | | | | | | | |
|---|---|---|---|---|---|---|---|---|---|
|  |  | 9 | 10 | 11 | 12 | 13 | 14 | 15 | 16 |
| Composition | (A) | 35 | 80 | 70 | 45 | 35 | 90 | 40 | 20 |
| (in parts | (B) | 50 | 15 | 30 | 15 | 60 | 10 | 45 | 60 |
| by weight) | (C) | 15 | 5 | 0 | 40 | 5 | 0 | 15 | 20 |
| Pattern stability | | B | D | D | B | B | D | B | B |
| Surface smoothness | | B | D | D | B | B | D | B | B |
| Sb residue | | 100 | 75 | 95 | 70 | 100 | 60 | 100 | 100 |
| Thermal shrinkage | | 1.5 | 8.0 | 4.5 | 2.5 | 1.5 | 11.5 | 2.0 | 2.0 |
| Vacuum formablility | | D | B' | B' | D | D | D | D | D |
| Sb at 200° C | | 0.35 | 0.03 | 0.04 | 0.55 | 0.40 | 0.001 | 0.32 | 0.80 |
| γb at 200° C | | 180 | 450 | 350 | 120 | 130 | 500 | 190 | 120 |

Note: A = fairly good; B = good or passable;
B' = somewhat good; C = rather poor, C' = somewhat problematic, D = poor.
The pattern stability surface smoothness, and other properties were determined by the same methods as described in connection with Table 1.

REFERENTIAL EXAMPLES 17–20:

These examples show that when the proportion of incorporation of plasticizers is deviated from the range as defined by the present invention, the physical properties of each sheet are liable to become unsatisfactory. The proportion of plasticizers in these comparative examples are shown below.

| ARON NS-1100 | 60 parts by weight |
|---|---|
| AES-1 | 33 parts by weight |
| NBR 230SH | 7 parts by weight |
| Stabilizer | 2.1 parts by weight |
| Plasticizer (T-09, KAPOX-S-6) | variable amounts |

Table 4 shows the results of tests by the same evaluation as of comparative examples 9–16, based on the abovementioned prescription of incorporation.

Table 4

|  |  | Ref. Ex. | | | |
|---|---|---|---|---|---|
|  |  | 17 | 18 | 19 | 20 |
| Plasticizer | T-08 | 0 | 50 | 60 | 70 |
|  | KAPOX-S-6 | 0 | 5 | 5 | 10 |
| Shore hardness | | 73 | 32 | 28 | 25 |
| Vacuum formability | | B | D | D | D |
| Sb at 200° C | | 0.17 | under 0.001 | under 0.001 | under 0.001 |
| γb at 200° C | | 300 | 320 | 300 | 320 |
| Pattern stability | | B | C' | D | D |

What is claimed is:

1. A highly weather-resistant, thermoformable sheeting prepared by mixing (a) from 45 to 70 parts by weight of a rigid thermoplastic resin selected from the group consisting of polyvinyl chlorides and copolymers each of which is composed mostly of vinyl chloride and a small amount of a monoolefinic monomer copolymerizable with the vinyl chloride, from 20 to 50 parts by weight of a thermoplastic resin obtained by a graft polymerization of from 20 to 40 parts by weight of an ethylene-propylene copolymer rubber or ethylene-propylene-diene terpolymer with from 60 to 80 parts by weight of a vinyl monomer mixture consisting of from 40 to 90 percent by weight of an alkenyl aromatic compound and from 10 to 60 percent by weight of at least one monomer copolymerizable with the alkenyl aromatic compound, and from 5 to 35 parts by weight of an acrylonitrile-butadiene rubber, with (b) from 5 to 50 parts by weight of a plasticizer or plasticizers for polyvinyl chloride added to 100 parts by weight of the resinous mixture (a).

2. A sheeting according to claim 1, wherein the polyvinyl chloride is granular polyvinyl chloride.

3. A sheeting according to claim 1, wherein the alkenyl aromatic compound is at least one compound selected from the group consisting of styrene, α-methylstyrene, and p-methylstyrene.

4. A sheeting according to claim 1, wherein the monomer copolymerizable with the alkenyl aromatic compound is at least one compound selected from the group consisting of vinylcyanic compounds, esters of acrylic acid and esters of methacrylic acid.

5. A sheeting according to claim 4, wherein said copolymerizable monomer is selected from the group consisting of acrylonitrile and methacrylonitrile.

6. A sheeting according to claim 4, wherein said copolymerizable monomer is selected from the group consisting of methyl acrylate, ethyl acrylate and octyl acrylate.

7. A sheeting according to claim 4, wherein said copolymerizable monomer is selected from the group consisting of butyl methacrylate and methyl methacrylate.

8. A sheeting according to claim 1, wherein the polyvinyl chloride plasticizer is selected from the group consisting of esters of phthalic acid, esters of trimellitic acid and epoxy-fatty acid esters.

9. A sheeting according to claim 8, wherein said plasticizer is selected from the group consisting of dioctyl phthalate, diisodecyl phthalate and trioctyl trimellitate.

10. A sheeting according to claim 4, wherein the alkenyl aromatic compound is at least one compound selected from the group consisting of styrene, α-methylstyrene and p-methylstyrene; the monomer copolymerizable with the alkenyl aromatic compound is at least one compound selected from the group consisting of vinylcyanic compounds, esters of acrylic acid and esters of methacrylic acid; the polyvinyl chloride is granular polyvinyl chloride; and the plasticizer is selected from the group consisting of esters of phthalic acid, esters of trimellitic acid and epoxy-fatty acid esters.

* * * * *